(12) United States Patent
LaRosa et al.

(10) Patent No.: US 7,068,708 B2
(45) Date of Patent: Jun. 27, 2006

(54) METHOD AND RECEIVING UNIT FOR DEMODULATING A MULTI-PATH SIGNAL

(75) Inventors: Christopher LaRosa, Crystal Lake, IL (US); Tracie Schitzinger, Fontana, WI (US); David Steckl, Elkhorn, WI (US)

(73) Assignee: Motorola, Inc., Schaumburg, IL (US)

( * ) Notice: Subject to any disclaimer, the term of this patent is extended or adjusted under 35 U.S.C. 154(b) by 244 days.

(21) Appl. No.: 10/319,014

(22) Filed: Dec. 13, 2002

(65) Prior Publication Data

US 2004/0114672 A1 Jun. 17, 2004

(51) Int. Cl.
 H04B 1/69 (2006.01)
 H04B 1/707 (2006.01)
 H04B 1/713 (2006.01)

(52) U.S. Cl. ............... 375/148; 375/144; 375/150; 375/142

(58) Field of Classification Search ......... 375/142, 375/143, 144, 145, 148, 149, 150, 152; 370/342, 370/441, 335
See application file for complete search history.

(56) References Cited

U.S. PATENT DOCUMENTS

| | | | |
|---|---|---|---|
| 5,768,307 A * | 6/1998 | Schramm et al. ............ | 375/150 |
| 5,818,866 A * | 10/1998 | Wilk ....................... | 375/149 |
| 6,201,799 B1 | 3/2001 | Huang et al. | |
| 6,266,365 B1 * | 7/2001 | Wang et al. ................ | 375/150 |
| 6,330,271 B1 | 12/2001 | Klang et al. | |
| 6,442,193 B1 * | 8/2002 | Hirsch ...................... | 375/147 |
| 6,504,816 B1 * | 1/2003 | Kim et al. ................. | 370/204 |
| 6,526,264 B1 * | 2/2003 | Sugar et al. ................ | 455/84 |
| 2004/0146094 A1 | 7/2004 | Kong et al. | |

OTHER PUBLICATIONS

*Addressing Multipath Propagation Employing RAKE Receiver Technology in WinAir™ System* <http://www.radwin.com/papers_down1.html> (Dec. 2, 2002).
*Cellular Terminal Engine (CTE) IP Core*, Morphics Technology Inc., 2001.
"Wireless Communication," Chapter: Analog and Digital Transmission, Section: CDMA, <http://150.250.105.16/~krchnave/spring2002/wireless/Kluwer_CD/chaptr05/cdma/rake.htm> (Dec. 2, 2002).

* cited by examiner

*Primary Examiner*—Phuong Phu
(74) *Attorney, Agent, or Firm*—Lawrence J. Chapa

(57) ABSTRACT

A method (400) and a receiving unit (220) for demodulating a multi-path signal are described herein. The receiving unit (220) may be configured to receive the multi-path signal. The receiving unit (220) may include an input buffer controller (305), an input buffer (310), a rake finger (330), and a sum generator (340). The input buffer (310) may be configured to store data samples associated with a plurality of paths of the multi-path signal. The input buffer controller (305) may be configured to time-align the data samples relative to each other, and to delay the data samples. The rake finger (330) may be configured to de-spread and to accumulate the delayed data samples for a sub-correlation length. The sum generator (340) may be configured to combine a plurality of outputs from the rake finger (330). Each of the plurality of outputs corresponds to one of the plurality of paths of the multi-path signal.

18 Claims, 4 Drawing Sheets

METHOD AND RECEIVING UNIT FOR DEMODULATING A MULTI-PATH SIGNAL

TECHNICAL FIELD

The present disclosure relates to wireless communication systems, and more particularly, to a method and a receiving unit for demodulating a multi-path signal.

BACKGROUND

In wireless communication systems, a signal transmitted through a wireless channel may be severely distorted because of interference, noise, and multi-path fading. The most severe distortion comes from multi-path fading. For example, a signal may not travel in a direct line-of-sight (LOS) path from the transmitter to the receiver. Instead, the signal may travel in a longer path after being reflected and/or refracted by objects such as vehicles, buildings, and mountains, before reaching the receiver. Thus, the receiver may receive multiple delay versions of the signal.

In a direct-sequence (DS) code division multiple access (CDMA) communication system, for example, a rake receiver is a common demodulation technology used to mitigate such distortion and to select the relevant signals from all other received signals. Conventional rake receivers are typically implemented digitally and include numerous logic gates and discrete memories. In particular, rake receivers include a number of rake fingers (i.e., correlators) to process the multiple paths of a multi-path signal. For example, a rake receiver integrated within a mobile station may include three (3) rake fingers whereas a rake receiver integrated within a base station may include four (4) or five (5) rake fingers. Accordingly, manufacturing cost of mobile stations and base stations using conventional rake receivers are increased. Therefore, a need exists to reduce the manufacturing cost of the receiving unit integrated into mobile stations and/or base stations.

BRIEF DESCRIPTION OF THE DRAWINGS

This disclosure will describe several embodiments to illustrate its broad teachings. Reference is also made to the attached drawings.

DETAILED DESCRIPTION

Figure 1:
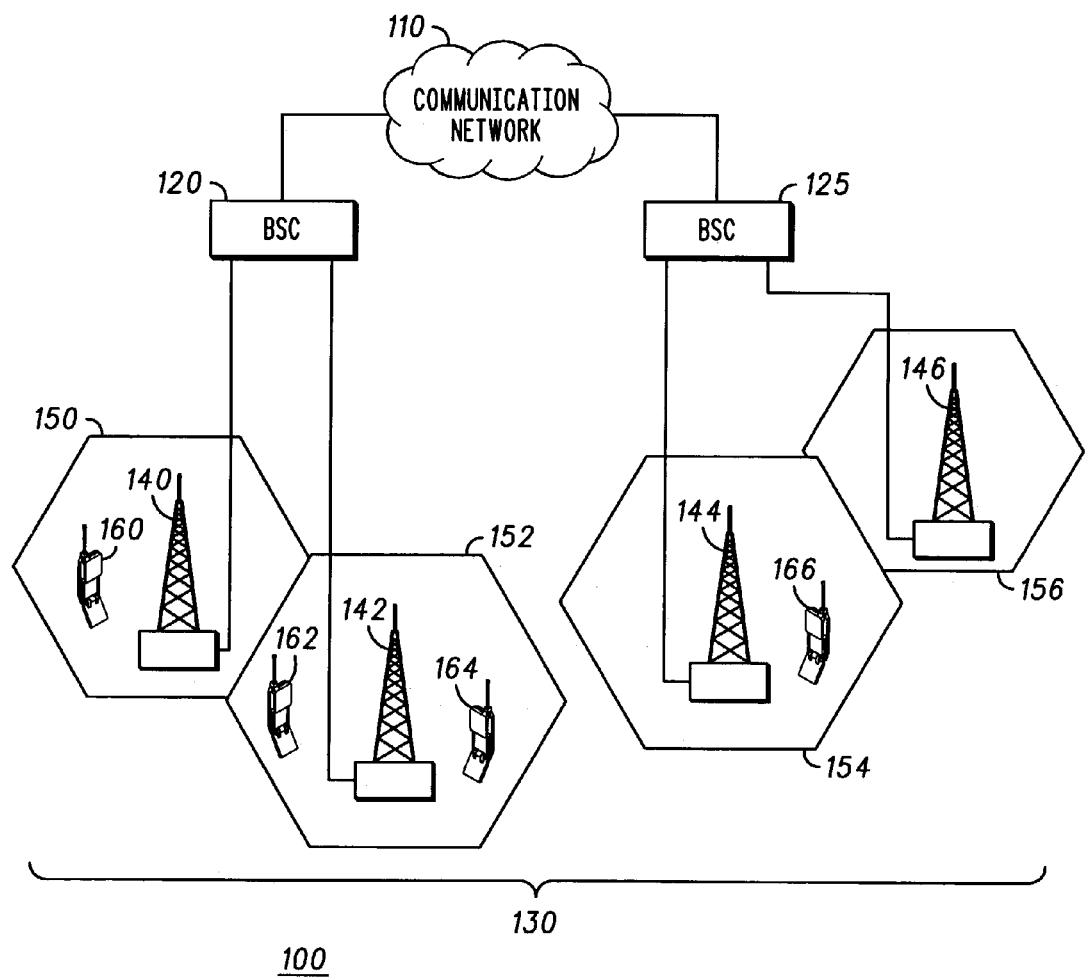
FIG. 1 is a block diagram representation of a wireless communication system.

A method and a receiving unit for demodulating a multi-path signal are described. In a wireless communication system, a receiving unit is configured to receive a multi-path signal. The receiving unit may be integrated into either a mobile station or a base station. In particular, the receiving unit may include an input buffer controller, an input buffer, a rake finger, and a sum generator. The input buffer controller is operatively coupled to the input buffer, which in turn, is operatively coupled to the rake finger. The rake finger is operatively coupled to the sum generator. The receiving unit may store data samples associated with a plurality of paths of the multi-path signal within the input buffer. The input buffer controller may time-align or de-skew the data samples. Further, the input buffer controller may delay the data samples to provide a delayed data sample and a non-delayed data sample to the rake finger via the input buffer. In particular, the input buffer may provide the delayed data sample as an input to a data correlator within the rake finger, and provide the non-delayed data sample as an input to a pilot correlator within the rake finger. The rake finger may de-spread and accumulate the delayed data samples for a fixed, pre-determined sub-correlation length to produce a sub-correlation. For example, the sub-correlation length may be a number of chips less than or equal to a minimum spread factor supported by the receiving unit. The spread factor may be a number of chips per data symbol. The hardware of the rake finger may be time-shared so that a plurality of outputs are provided sequentially to the sum generator. The sum generator may combine the plurality of outputs from the rake finger to produce a data symbol. Each of the plurality of outputs corresponds to one of the plurality of paths of the multi-path signal. As a result, the multi-path signal may be demodulated by the receiving unit.

A communication system in accordance with the present disclosure is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular system, the IS-95 Code Division Multiple Access (CDMA) digital cellular system, the CDMA 2000 system, the Wideband CDMA (W-CDMA) system (e.g., direct-sequence (DS) CDMA), the Personal Communications System (PCS), the Third Generation (3G) system, the Universal Mobile Telecommunications System (UMTS) and variations and evolutions of these protocols.

A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base station as part of the base station subsystem to provide the mobile station with real-time voice, data, and multimedia services (e.g., a call).

Referring to FIG. 1, a wireless communication system 100 includes a communication network 110, and a plurality of base station controllers (BSC), generally shown as 120 and 125, servicing a total service area 130. As is known for such systems, each BSC 120 and 125 has associated therewith a plurality of base stations (BS), generally shown as 140, 142, 144, and 146, servicing communication cells, generally shown as 150, 152, 154, and 156, within the total service area 130. The BSCs 120 and 125, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
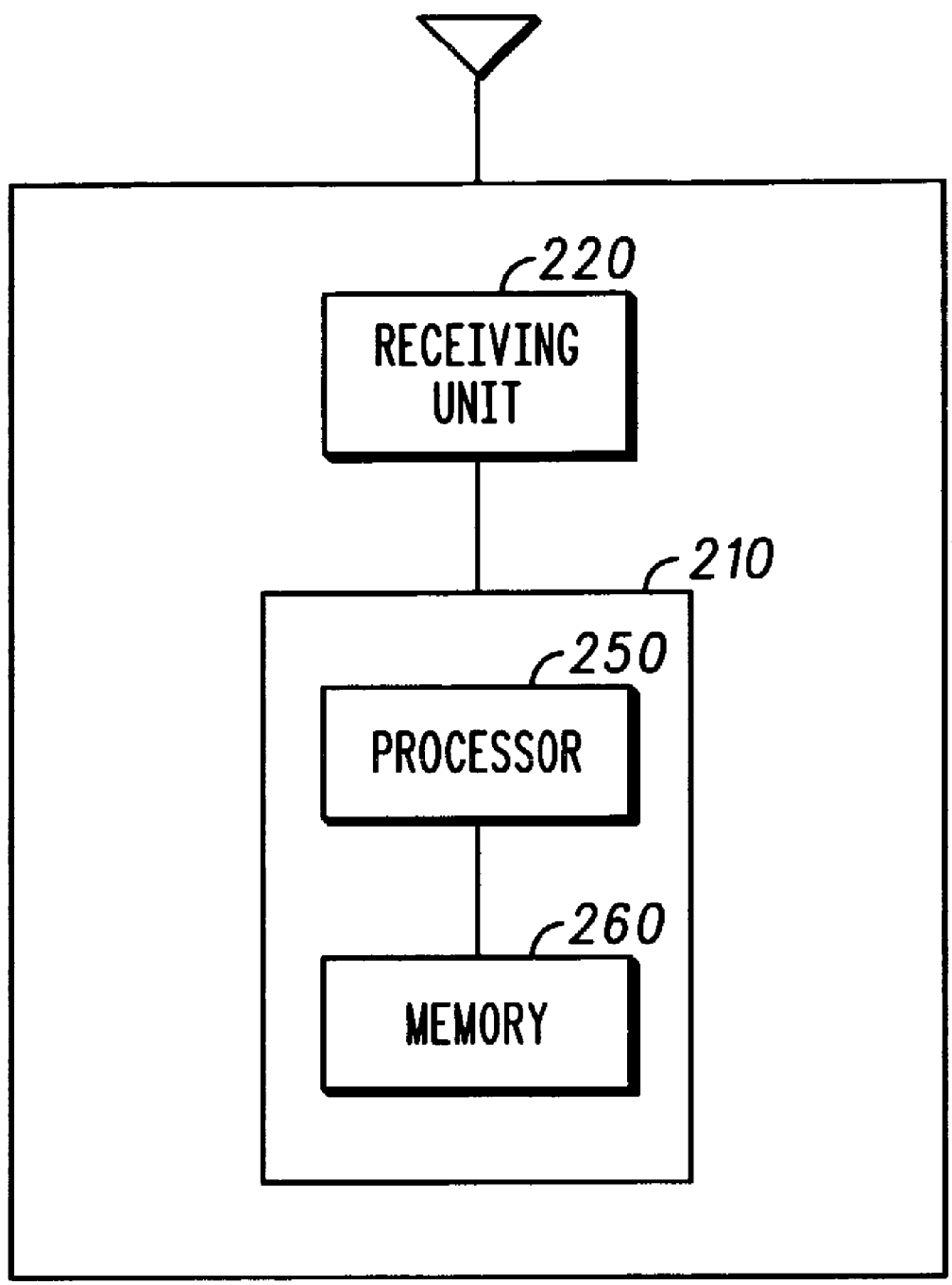
FIG. 2 is a block diagram representation of a mobile station.

Referring to FIG. 2, a mobile station (one shown as 160 in FIG. 1) adapted to demodulate a multi-path signal is shown. The mobile station 160 generally includes a controller 210 and a receiving unit 220. The controller 210 includes a processor 250 and a memory 260. The processor 250 is operatively coupled to the memory 260, which stores a program or a set of operating instructions for the processor 250. The processor 250 executes the program or the set of operating instructions such that the mobile station 160 operates as described herein. The program or the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media.

Figure 3:
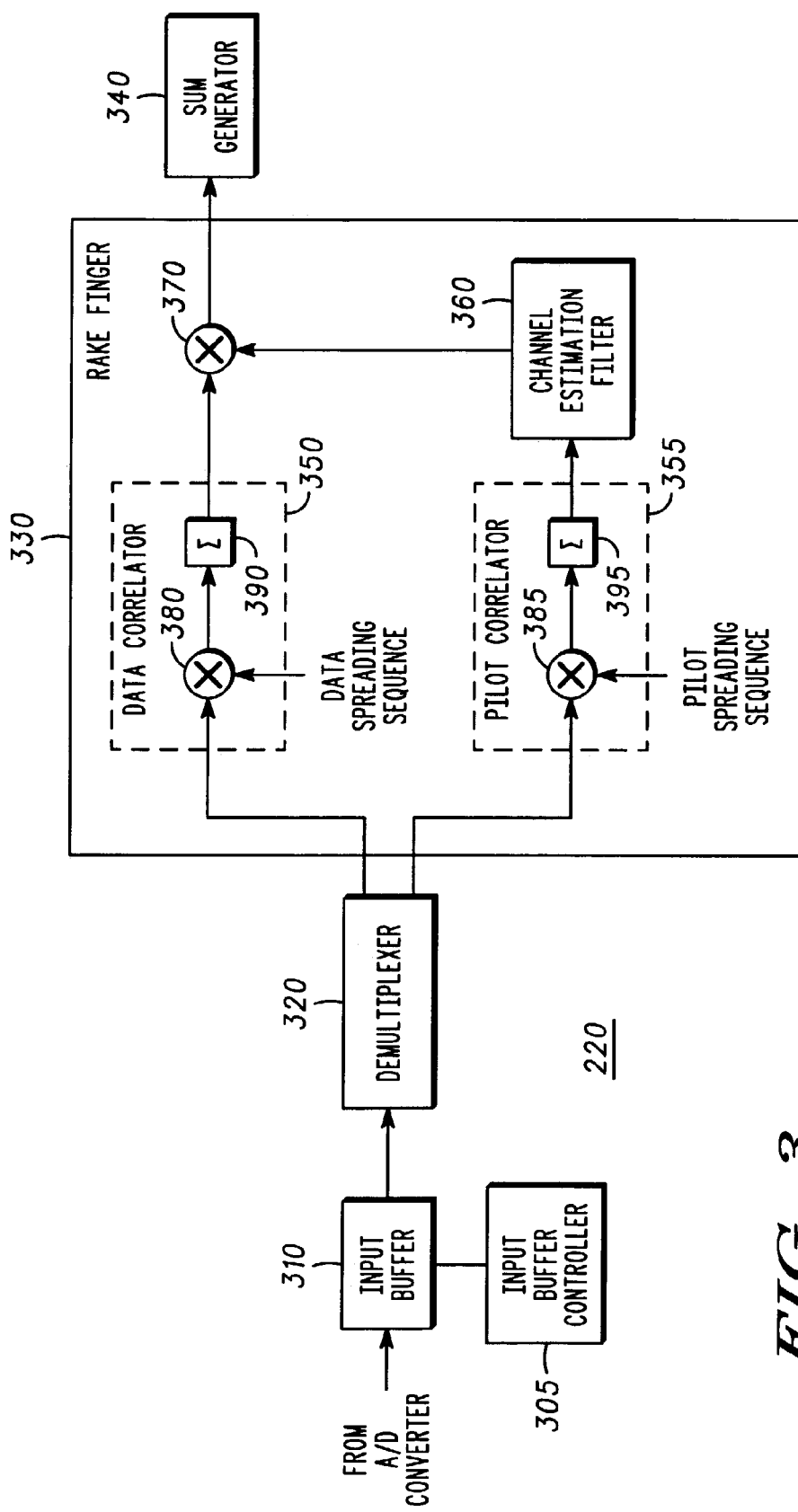
FIG. 3 is a block diagram representation of a receiving unit.

Referring to FIG. 3, the receiving unit 220 includes an input buffer controller 305, an input buffer 310, a demultiplexer 320, a rake finger 330, and a sum generator 340. The input buffer controller 305 is operatively coupled to the input buffer 310, which in turn, is operatively coupled to the rake finger 330 via a demultiplexer 320. The rake finger 330 generally includes a data correlator 350, a pilot correlator 355, and a channel estimation filter 360, and a multiplier 370. Each of the data correlator 350 and the pilot correlator 355 includes a multiplier (shown as 380 and 385, respectively) and an accumulator (shown as 390 and 395, respectively). The pilot correlator 355 is operatively coupled to the channel estimation filter 360. Along with the data correlator 350, the channel estimation filter 360 is operatively coupled to the multiplier 370.

A basic flow for demodulating a multi-path signal that may be applied with the mobile station 160 incorporating the receiving unit 220 shown in FIG. 3 may start with the input buffer 310 receiving a baseband signal from a conventional analog-to-digital (A/D) converter (not shown) integrated within the receiving unit 220. The input buffer 310 may store data samples associated with the baseband signal. Accordingly, the hardware within the receiving unit 220 may be time-shared by multiple paths of a multi-path signal. That is, the receiving unit 220 may not necessarily and physically need additional rake fingers to demodulate a multi-path signal because the hardware of the rake finger 330 may operate on a time-shared basis as if a plurality of rake fingers are physically coupled in parallel to the input buffer 310.

The input buffer controller 305 may time-align and delay the data samples, which in turn, are routed to the data correlator 350 and the pilot correlator 355 of the rake finger 320 via the demultiplexer 320. The input buffer 305 controls the generation of the address signals and timing signals used by the input buffer 310 for managing the output data supplied to the rake finger 330 via the demultiplexer 320. By managing the order in which data is read from the input buffer 310 and supplied to the rake finger 330, the input buffer controller 305 time aligns or de-skews the data samples corresponding to multiple paths of the received multi-path signal, and delays the data samples provided to the data correlator 350 relative to the data samples provided to the pilot correlator 355. In particular, a delayed data sample may be routed to the data correlator 350 whereas a non-delayed data sample may be routed to the pilot correlator 355. The data correlator 350 may de-spread the delayed data sample with a data spreading sequence via the multiplier 380, and then accumulate the output of the multiplier 380 over a sub-correlation length within the accumulator 390. The sub-correlation length may be, but is not limited to, a number of chips less than or equal to a spread factor associated with the mobile station 160. The spread factor corresponds to a number of chips in a data symbol. In a wideband CDMA (W-CDMA) based communication system, for example, the spread factor may be a minimum of four (4) chips and a maximum of 512 chips. As a result, the rake finger 330 may operate at a constant sub-correlation length even when the receiving unit 220 may need to support a wide range of data rates.

As noted above, non-delayed data samples from the input buffer 310 (i.e., via the demultiplexer 320) are provided as inputs to the pilot correlator 355. In particular, the pilot correlator 355 may de-spread the non-delayed data samples with a pilot spreading sequence via the multiplier 385. In a W-CDMA based communication system, for example, the pilot correlator 355 may accumulate the outputs of the multiplier 385 over 256 chips within the accumulator 395. Accordingly, the channel estimation filter 360 may average the output of the pilot correlator 355 to form a reference phase estimate and a reference amplitude estimate corresponding to the delayed data samples from the data correlator 350. The channel estimation filter 360 introduces a time delay that is equal to the delay applied to the delayed data samples.

Based on the outputs of the data correlator 350 and the channel estimation filter 360, the multiplier 370 provides an output of the rake finger 320 to the sum generator 340. In turn, the sum generator 340 may accumulate the outputs of the rake finger 320 (i.e., sub-correlations) over the spread factor (i.e., number of chips per data symbol) to generate data symbols. As noted above, the hardware of the rake finger 330 may be used repeatedly (i.e., time-shared) because data samples associated with the plurality of paths of the multi-path signal are time-aligned at the input of the rake finger 330. Because the rake finger 330 is time-shared, the data correlator 350 and the pilot correlator 355 may operate at a clock rate of at least N times the chip rate of the receiving unit 220, where N is the number of conventional physical rake fingers replaced by the input buffer controller 305 operating the input buffer 310 in conjunction with the rake finger 320. To do so, the input buffer 310 may be operated at 2N times the chip rate or greater to provide the delayed data samples and the non-delayed data samples to the data correlator 350 and the pilot correlator 355, respectively.

Accordingly, the sum generator 340 may be configured to accumulate sub-correlations of the plurality of paths from the rake finger 330. That is, the hardware of the rake finger 330 may be operated as if a number of conventional rake fingers are operatively coupled to the sum generator 340. Rather than receiving sub-correlations from multiple physical rake fingers that are typically implemented in parallel, the sum generator 340 may be operatively coupled to a single rake finger (shown as rake finger 330) that provides a sequence of sub-correlations corresponding to multiple paths of a multi-path signal. The sum generator 340 may produce a sub-total after each sub-correlation is provided by the rake finger 330 until the entire sequence of sub-correlations is accumulated. Thus, the sum generator 340 may accumulate the sub-correlations as provided by the single rake finger 330 to produce a data symbol.

Figure 4:
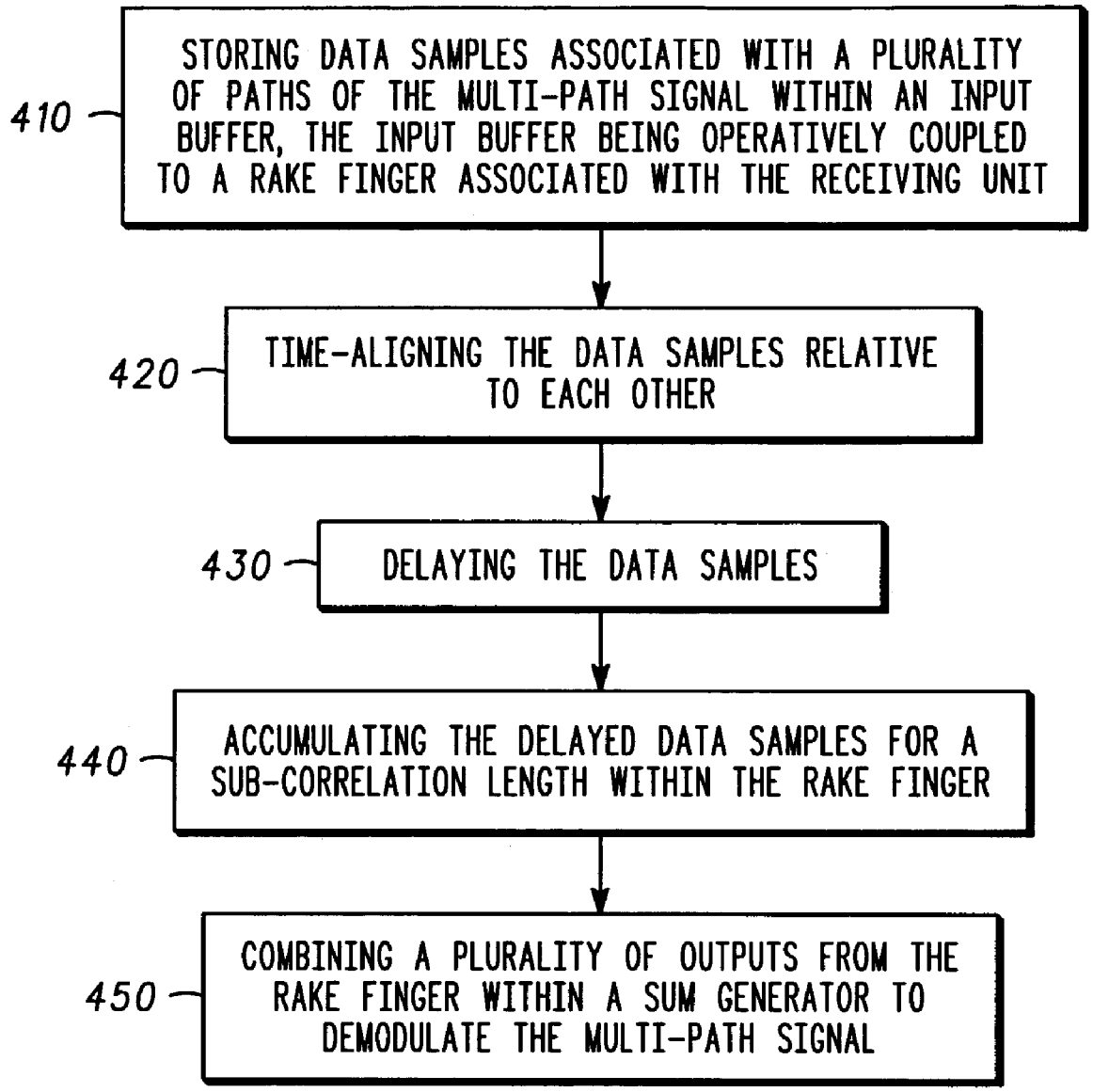
FIG. 4 is a flow diagram illustrating a method for demodulating a multi-path signal.

One possible implementation of the computer program executed by the mobile station 160 (e.g., via the processor 350) is illustrated in FIG. 4. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 4, persons of ordinary skill in the art will appreciate that these steps can be performed in other temporal sequences. Again, the flow chart 400 is merely provided as an example of one way to program the receiving unit 220 to demodulate a multi-path signal. The flow chart 400 begins at step 410, wherein the receiving unit 220 may store data samples associated with a plurality of paths of the multi-path signal within an input buffer. The receiving unit 220 at step 420 may time-align the data samples relative to each other. Further, the receiving unit 220 at step 430 may delay the data samples. Upon delaying the data samples, the receiving unit 220 at step 440 may de-spread and accumulate the delay data samples for a sub-correlation length within a rake finger. Because the hardware of the rake finger may be configured to be time-shared as described above, the receiving unit 220 at step 450 may accumulate a plurality of outputs from the rake finger within a sum generator. That is, the sum generator may be operatively coupled to the rake finger, which in turn, provides the plurality of outputs. Each of the plurality of outputs corresponds to one of the plurality of paths of the multi-path signal. As a result, the data samples associated with the plurality of paths of the multi-path signal may be demodulated.

Although much of the above discussion has focused on implementing the receiving unit within a mobile station, persons of ordinary skill in the art will appreciate that the receiving unit may used with a base station as well (one shown as 140 in FIG. 1).

Many changes and modifications to the embodiments described herein could be made. The scope of some changes is discussed above. The scope of others will become apparent from the appended claims.

What is claimed is:

1. In a wireless communication system, wherein a receiving unit is configured to receive a multi-path signal, a method for demodulating the multi-path signal, the method comprising:

storing data samples associated with a plurality of paths of the multi-path signal within an input buffer, the input buffer being operatively coupled to a rake finger associated with the receiving unit;

time-aligning the data samples relative to each other;

delaying the data samples;

de-spreading and accumulating the delayed data samples for a sub-correlation length within the rake finger; and combining a plurality of outputs from the rake finger within a sum generator to demodulate the multi-path signal, wherein the plurality of outputs include outputs corresponding to the plurality of paths of the multi-path signal.

2. The method of claim 1, wherein the step of delaying the data samples within the input buffer comprises:

providing a delayed data sample as an input for a data correlator within the rake finger, and providing a non-delayed data sample as an input for a pilot correlator within the rake finger.

3. The method of claim 1, wherein the step of de-spreading and accumulating the delayed data samples for a sub-correlation length within the rake finger comprises de-spreading and accumulating the delayed data samples for a number of chips less than or equal to a spread factor.

4. The method of claim 1, further comprising integrating the receiving unit into one of a mobile station and a base station.

5. The method of claim 1, wherein the communication system comprises a code division multiple access (CDMA) based communication system.

6. The a wireless communication system, a receiving unit for demodulating a multi-path signal, a receiving unit comprising:

an input buffer, the input buffer configured to receive a multi-path signal, and to store data samples associated with a plurality of paths of the multi-path signal;

an input buffer controller operatively coupled to the input buffer, the input buffer controller being configured to time-align the data samples relative to each other, and to delay the data samples;

a rake finger operatively coupled to the input buffer, the rake finger configured to de-spread and to accumulate the delayed data samples for a sub-correlation length; and a sum generator operatively coupled to the rake finger, the sum generator configured to accumulate a plurality of outputs from the rake finger, wherein the plurality of outputs include outputs corresponding to the plurality of paths of the multi-path signal.

7. The receiving unit of claim 6 is integrated into one of a mobile station and a base station.

8. The receiving unit of claim 6, wherein the sub-correlation length is a number of chips less than or equal to a spread factor.

9. The receiving unit of claim 6, wherein the rake finger comprises a data correlator configured to de-spread and to accumulate delayed data samples for a sub-correlation length.

10. The receiving unit of claim 6 is operable in accordance with a code division multiple access (CDMA) based communication protocol.

11. In a wireless communication system, wherein a receiving unit is configured to receive a multi-path signal, and wherein a processor operates in accordance with a computer program embodied on a computer-readable medium for demodulating the multi-path signal, the computer program comprising:

a first routine that directs the processor to store data samples associated with a plurality of paths of the multi-path signal within an input buffer, the input butter being operatively coupled to a rake finger associated with the receiving unit;

a second routine that directs the processor to time-align the data samples relative to each other;

a third routine that directs the processor to delay the data samples;

a fourth routine that directs die processor to de-spread and to accumulate the delayed data samples for a sub-correlation length within the rake finger; and a fifth routine that directs the processor to combine a plurality of outputs from the rake finger within a sum generator to demodulate the multi-path signal, wherein the plurality of outputs include outputs corresponding to the plurality of paths of the multi-path signal.

12. The computer program of claim 11, wherein the third routine comprises:

a routine that directs the processor to provide a delayed data sample as an input for a data correlator within the rake finger, and a routine that directs the processor to provide a non-delayed data sample as an input for a pilot correlator within the rake finger.

13. The computer program of claim 11, wherein the fourth routine comprises a routine that directs the processor-to de-spread and to accumulate the delayed data samples for a number of chips less than or equal to a spread factor.

14. The computer program of claim 11, wherein the receiving unit is integrated into one of a mobile station and a base station.

15. The computer program of claim 11 is operable in accordance with a code division multiple access (CDMA) based communication protocol.

16. The computer program of claim 11, wherein the medium is one of paper, a programmable gate array, application specific integrated circuit, erasable programmable read only memory, read only memory, random access memory, magnetic media, and optical media.

17. In a wireless communication system, a receiving means for demodulating a signal, a receiving means comprising:

a means for storing data samples associated with a plurality of paths of the multi-path signal;

a means for time-aligning the data samples relative to each other, a means for delaying the data samples;

a means for de-spreading and accumulating the delayed data samples for a sub-correlation length; and a means for combining a plurality of outputs from the rake finger within a sum generator to demodulate the multi-path signal, wherein the plurality of outputs include outputs corresponding to the plurality of paths of the multi-path signal.

18. The receiving means of claim 17, wherein the means for de-spreading and accumulating the delayed data samples for a sub-correlation length within the rake finger comprises a means for de-spreading and accumulating the delayed data samples for a number of chips less than or equal to a spread factor.

* * * * *